(12) United States Patent
Gong et al.

(10) Patent No.: US 8,159,609 B2
(45) Date of Patent: Apr. 17, 2012

(54) IMAGE PROCESSING CHIP AND RELATED METHOD FOR PROCESSING VIDEO

(75) Inventors: Jin-Sheng Gong, Tao-Yuan Hsien (TW); Jui-Yuan Tsai, Tai-Nan (TW); Yu-Pin Chou, Miao-Li Hsien (TW); Yueh-Hsing Huang, Tai-Chung Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1435 days.

(21) Appl. No.: 11/685,217

(22) Filed: Mar. 13, 2007

(65) Prior Publication Data

US 2007/0211173 A1 Sep. 13, 2007

(30) Foreign Application Priority Data

Mar. 13, 2006 (TW) .............................. 95108401 A
Mar. 13, 2007 (TW) .............................. 96108649 A

(51) Int. Cl.
*H04N 7/00* (2006.01)
(52) U.S. Cl. ........ 348/473; 348/468; 348/687; 348/689; 348/690; 348/691
(58) Field of Classification Search .................. 348/468, 348/473, 687, 689, 690, 691; 358/153, 139, 358/148, 171, 172, 34, 160
See application file for complete search history.

(56) References Cited

U.S. PATENT DOCUMENTS

| | | | | |
|---|---|---|---|---|
| 3,446,914 A * | 5/1969 | Hodge | ............................ | 386/224 |
| 3,792,195 A * | 2/1974 | Wilson et al. | .................. | 348/184 |
| 4,095,259 A * | 6/1978 | Sawagata | ...................... | 348/472 |
| 4,385,319 A * | 5/1983 | Hasegawa | ...................... | 348/532 |
| 4,408,226 A * | 10/1983 | Dean et al. | ..................... | 348/184 |
| 4,580,166 A * | 4/1986 | Okano | ............................ | 348/531 |
| 4,853,782 A * | 8/1989 | Asano et al. | ................... | 348/695 |
| 5,231,507 A * | 7/1993 | Sakata et al. | .................... | 386/274 |
| 5,351,129 A * | 9/1994 | Lai | ................................ | 348/584 |
| 5,712,948 A * | 1/1998 | Yamada et al. | ................ | 386/245 |
| 5,721,559 A * | 2/1998 | Nagakubo | ........................ | 345/63 |
| 6,104,440 A * | 8/2000 | Yata | ................................ | 348/722 |
| 6,219,106 B1 * | 4/2001 | Sato | ................................ | 348/525 |
| 6,577,348 B1 * | 6/2003 | Park | ................................ | 348/554 |
| 6,628,222 B2 * | 9/2003 | Go | .................................. | 341/155 |
| 6,757,484 B2 * | 6/2004 | Nitta et al. | ..................... | 386/211 |
| 7,095,452 B2 * | 8/2006 | Tachibana | ..................... | 348/691 |
| 2002/0129380 A1 * | 9/2002 | Orii | ................................. | 725/136 |
| 2002/0140856 A1 * | 10/2002 | Inoue | ............................ | 348/465 |
| 2002/0190882 A1 * | 12/2002 | Go | .................................. | 341/139 |
| 2003/0174249 A1 * | 9/2003 | Grillo | ............................ | 348/572 |
| 2004/0021796 A1 * | 2/2004 | Fang et al. | ..................... | 348/694 |

* cited by examiner

*Primary Examiner* — Jefferey Harold
*Assistant Examiner* — Sam Huang
(74) *Attorney, Agent, or Firm* — Thomas, Kayden, Horstemeyer & Risley, LLP

(57) ABSTRACT

The invention relates to an image processing chip and related method. The image processing chip includes a pin for receiving a composite signal; a synchronization signal detecting circuit, coupled to the pin, for extracting a synchronization signal from the composite signal; a clamping circuit, coupled to the pin, for adjusting a voltage level of the composite signal according to the synchronization signal; and an analog to digital converter, coupled to the pin, for generating a video signal by sampling the composite signal.

20 Claims, 3 Drawing Sheets

IMAGE PROCESSING CHIP AND RELATED METHOD FOR PROCESSING VIDEO

CROSS-REFERENCE TO RELATED APPLICATION

This application claims priority to, and the benefit of, Taiwanese Patent Application No. 095108401, filed on Mar. 13, 2006, and Taiwanese Patent Application No. 096108649, filed on Mar. 13, 2007, both of which are incorporated by reference in their entireties herein.

BACKGROUND OF THE INVENTION

1. Field of the Invention

The invention relates to an image processing chip and related method thereof, and more particularly, to an image processing chip capable of separating video signals and synchronization signals and the related method thereof.

2. Description of the Prior Art

Generally, a monitor can process and display a received video signal according to a horizontal synchronization signal and a vertical synchronization signal. In certain transmission interfaces with specific standards, the horizontal synchronization signal and the vertical synchronization signal are firstly integrated into a composite sync signal, and the composite sync signal is then attached to an image signal. For instant, a G signal of the RGB signal is associated with a green color, or the Y signal of the YPbPr signal is associated with a luminance. The above-mentioned green signal with the synchronization signal is also referred to as the SOG signal (i.e., sync on G), and the luminance signal with the composite synchronization signal is also referred to as the SOY signal (i.e., sync on Y). In order to illustrate these concepts conveniently, the following video signals, which include the composite synchronization signal, are referred to as the composite signal.

Please refer to FIG. 1. FIG. 1 is a circuit diagram of a conventional image processing chip 10. The image processing chip 10 sets two pins 12 and 14 for receiving the composite signal. The internal circuit (not shown) coupled to the pins 12 and 14 is utilized to collect the synchronization signal and the image signal from the composite signal respectively. The external portion of the image processing chip 10 includes capacitances 22 and 24, and a DC bias rebuilding circuit 16. The DC bias rebuilding circuit 16 adjusts the composite signal to a predetermined voltage level, and then obtains the synchronization signal from the internal circuit that is coupled to the pin 12. In this case, the internal circuit coupled to the pin 14 will latch the image signal from the composite signal according to the synchronization signal. Due to the pins 12 and 14 having two capacitances 22 and 24, the composite signal received from the pin 14 will not be affected by the DC bias rebuilding circuit 16.

The above-mentioned method of utilizing two pins to receive the same composite signal is quite uneconomical. Moreover, when the image processing chip 10 is designed to receive the video signals with a plurality of sources, the amount of pins required for the task will obviously increase. Therefore, the chip size and the cost to manufacture the chip will significantly increase.

SUMMARY OF THE INVENTION

It is therefore one of the objectives of the claimed invention to provide an image processing chip and related method for reducing the number of the pins required to achieve said task.

An exemplary embodiment of an image processing chip is disclosed. The image processing chip includes a pin for receiving a composite signal; a synchronization signal detecting circuit, for detecting a synchronization signal from the composite signal; a clamping circuit, for adjusting a voltage level of the composite signal according to the synchronization signal; and an analog to digital converter, for generating a video signal by sampling the composite signal.

Moreover, an exemplary embodiment of a video processing method applied in an image processing chip is disclosed. The image processing chip includes a pin for receiving a composite signal, the method includes detecting a synchronization signal from the composite signal; adjusting a voltage level of the composite signal according to the synchronization signal; and generating a video signal by sampling the composite signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
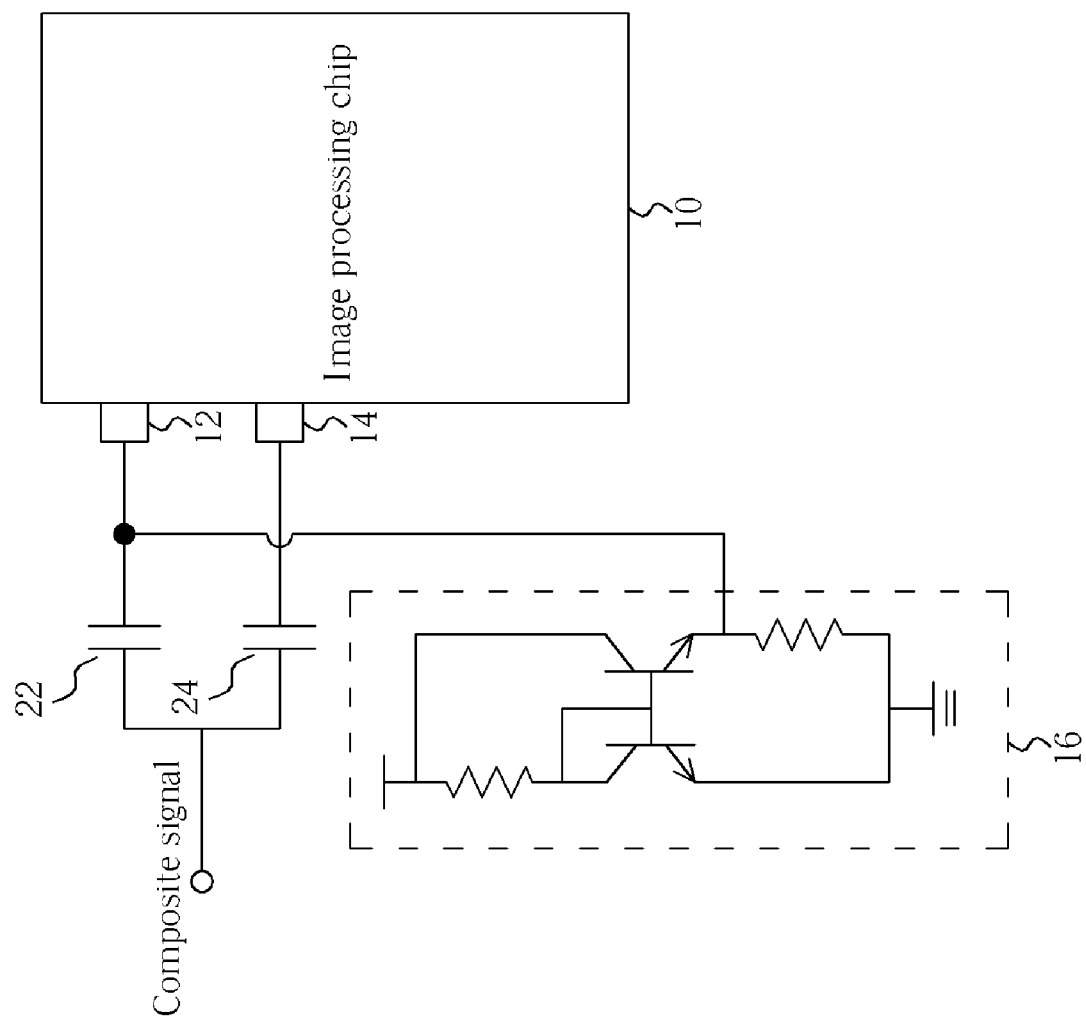
FIG. 1 is a circuit diagram of a conventional image processing chip.
Figure 2:
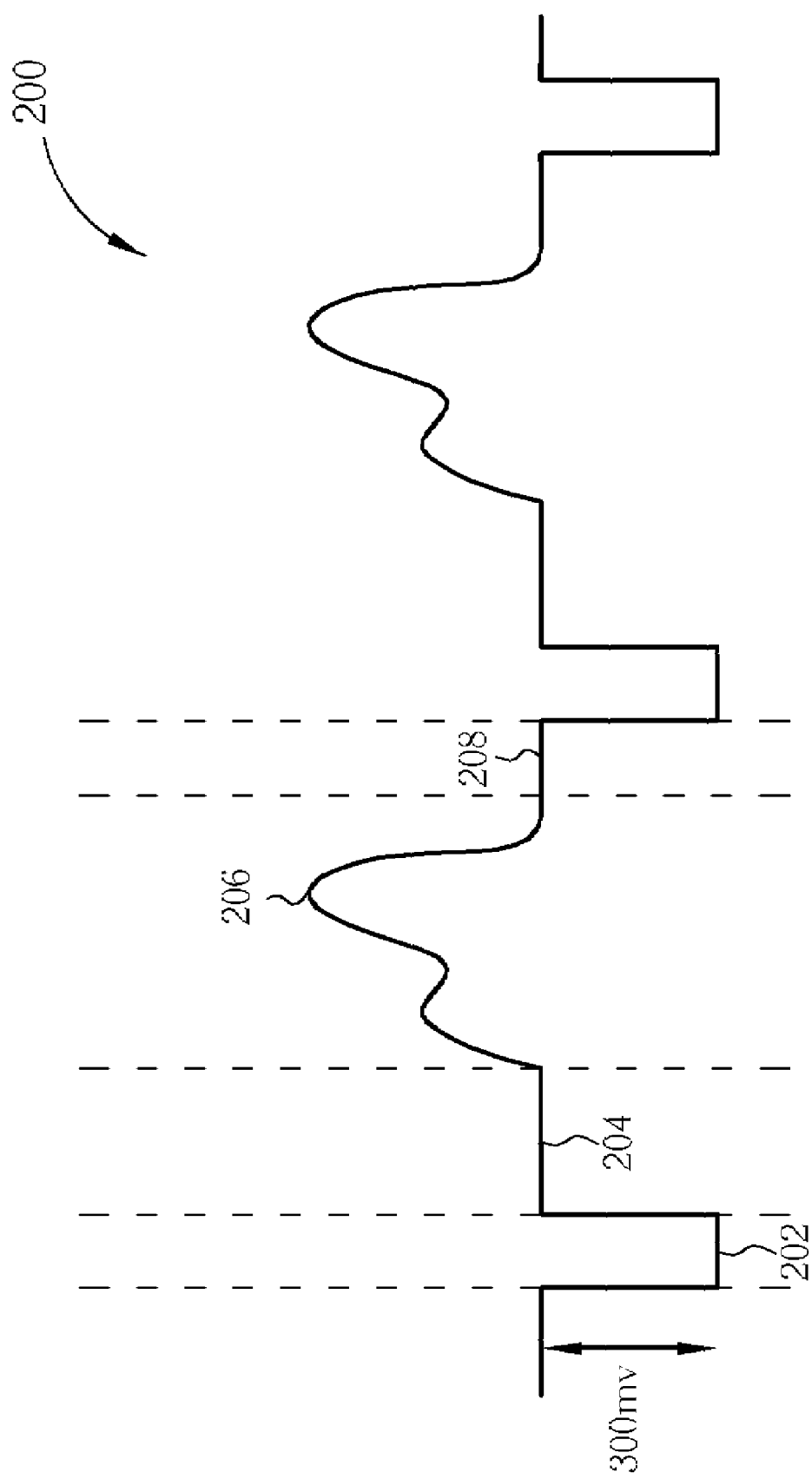
FIG. 2 is a schematic diagram of a composite signal received by the image processing chip of the present invention.

Please refer to FIG. 2. FIG. 2 is a schematic diagram of a composite signal 200 received by the image processing chip of the present invention. The composite signal 200 mentioned in the following text is the above-mentioned SOG signal, SOY signal, or any other video signal attached to the synchronization signal described in the prior art. As shown in the FIG. 2, the composite signal 200 is approximately divided into several blocks 202, 204, 206, and 208. The block 202 attaches the synchronization signal; the block 206 attaches the video signal; and blocks 204 and 208 provide the black level of the video signal. When the image processing chip processes the video signal of the block 206, the image processing chip needs a reference voltage level for correctly detecting the content of the video image. Therefore, the blocks 204 and 208 then provide the reference voltage level. Generally speaking, the voltage difference between the blocks 202 and 204 is 300 mV. However, the above-mentioned voltage difference may change depending on the different signal sources and with the different standards.

Figure 3:
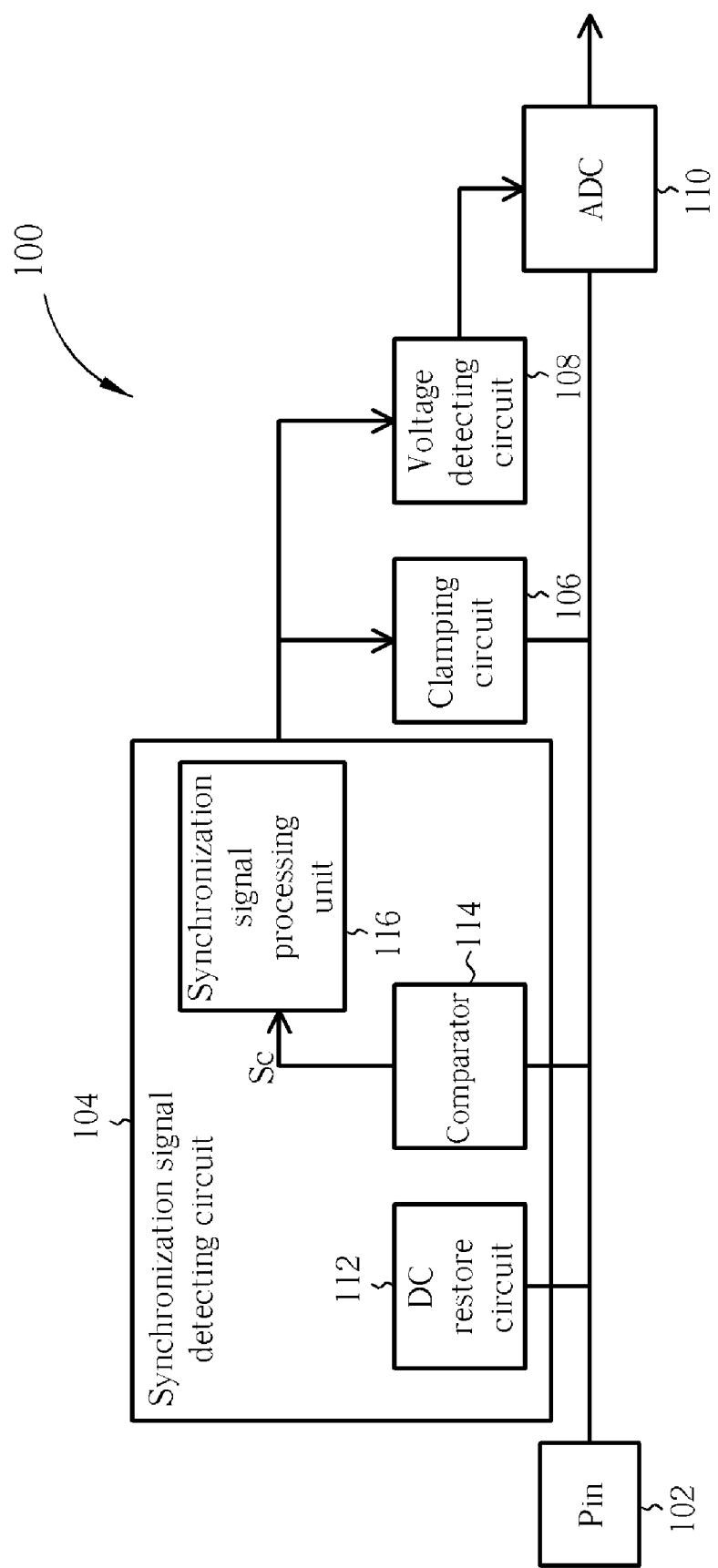
FIG. 3 is a block diagram of the image processing chip according to an embodiment of the present invention.

Please refer to FIG. 2 and FIG. 3 simultaneously. FIG. 3 is a block diagram of the image processing chip 100 according to an embodiment of the present invention. As shown in the FIG. 3, the image processing chip 100 includes a pin 102, a synchronization signal detecting circuit 104, a clamping circuit 106, a voltage detecting unit 108, and an analog to digital converter (ADC) 110. When the pin 102 receives the composite signal 200, the synchronization signal detecting circuit 104 detects if the composite signal 200 includes a synchronization signal Sync, and then convey the detected synchronization signal Sync to the clamping circuit 106 and the voltage detecting unit 108. Afterward, when the clamping circuit 106 detects the falling edge of the synchronization signal Sync (i.e., the block 202), the clamping circuit 106 will adjust the voltage level of the composite signal in order to raise the voltage level of the block 202 to 200 mV. The synchronization signal Sync can be regarded as an acknowledge signal to the voltage detecting unit 108. Then, the voltage detecting unit 108 is informed by the synchronization signal Sync that the synchronization signal Sync is detected. The voltage detecting unit 108 also utilizes the detecting result and a plurality of values transmitted by the ADC 110 to generate a control signal. The control signal is then transmitted to the ADC 110 to control the further operation of the ADC 110. Thus, the ADC 110 can correctly determine and sample the analog video signal of the block 206 to generate a digital video signal. The ADC 110 also returns a detecting signal including the plurality of values to the voltage detecting unit 108. The feedback plurality of values help the voltage detecting unit 108 to calculate and generate a more accurate control signal to improve the sampling of the ADC 110 thus to improve the quality of the digital signal. Please note that, the image processing chip of the present invention does not necessarily include the voltage detecting unit 108. However, in practice, by setting the voltage detecting unit 108 the image signal quality is raised.

Please note that, the operation of the clamping circuit 106 in the present invention is not limited in above-mentioned embodiments. In another embodiment of the present invention, the clamping circuit 106 also can pull the block 204 or 208 to 500 mV according to the synchronization signal Sync. In this case, the ADC 110 can directly determine the reference voltage level as 500 mV without utilizing the voltage detecting unit 108.

In this embodiment, the synchronization signal detecting circuit 104 further includes a DC restore circuit 112, a comparator 114, and a synchronization signal processing unit 116. When the image processing chip 100 receives the composite signal 200 from the pin 102, the DC restore circuit 112 will pull the lowest voltage level of the composite signal 200 to 200 mV. Thus, the voltage level of the block 202 will shift to 200 mV; the voltage level of the block 204 and 208 will shift to 500 mV; and the other block of the composite signal 200 will also shift. Next, the comparator 114 will compare the composite signal 200 with a threshold value (e.g., 350 mV) and send a comparative signal Sc to represent the comparing result of the composite signal 200 and the threshold value. In this embodiment, when the signal value corresponding to the composite signal 200 is lower than the threshold value, the signal value of the comparative signal Sc becomes −1 to indicate that the synchronization signal was detected; otherwise, the signal value of the comparative signal Sc becomes 0 to indicate that the synchronization signal was not detected. However, the corresponding relationship between the signal value of the comparative signal Sc and competitive result is not limited to the said descriptions in the above embodiments. Next, the synchronization signal processing unit 116 can determine if the composite signal 200 includes the synchronization signal Sync according to the comparative signal Sc. Please note that, in this embodiment, if the synchronization signal processing unit 116 detects that the signal value of the comparative signal Sc only drops to −1 in a very short time, it indicates that the composite signal 200 might be affected by the impulse noise. Therefore, the synchronization signal processing unit 116 will not determine that the synchronization signal Sync is detected. However, when the signal value of the comparative signal Sc maintains −1 for a certain period of time, the synchronization signal processing unit 116 will determine that the composite signal 200 is attached as a synchronization signal Sync, and will therefore send the synchronization signal Sync to the clamping circuit 106 and the voltage detecting unit 108.

It should be noted that the function of the DC restore circuit 112 and the clamping circuit 106 are similar to each other. The difference is that the DC restore circuit 112 starts to operate right after the power is being supplied, but the clamping circuit 106 starts to operate only after the synchronization signal is being triggered. After the synchronization signal detecting circuit 104 generates the synchronization signal, the clamping circuit 106 will be enabled to adjust the voltage level of the composite signal. Thus, the DC restore circuit 112 can stop operating. Moreover, the DC recovery circuit 112 and the clamping circuit 106 can adjust the composite signal to other voltage levels, and determine the threshold value of the comparator 114 according to the selected voltage level, wherein the threshold value is required to be set between the voltage level of the block 202 and 204.

In contrast to the related art, the image processing chip of the present invention relates to integrate the circuit utilized for latching the synchronization signal and video signal. Thus, the image processing chip of the present invention only requires a single pin to process the composite signal, such as the SOG signal and the SOY signal, to achieve the purpose of saving the number of the pins, and reducing the manufacturing cost of the chip. Moreover, for the DC restore circuit 112, utilizing the clamping circuit 106 can effectively improve the shortage that the content of image affects the DC level.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing chip, comprising:
   a pin for receiving a composite signal;
   a synchronization signal detecting circuit, for extracting a synchronization signal from the composite signal;
   a clamping circuit, for adjusting a voltage level of the composite signal according to an edge of the synchronization signal; and
   an analog to digital converter for generating an image signal by sampling the composite signal, wherein the synchronization signal detecting circuit, the clamping circuit, and the analog to digital converter are coupled directly to the pin.

2. The image processing chip of claim 1, wherein the synchronization signal detecting circuit comprises:
   a DC restore circuit for adjusting the voltage level of the composite signal; and
   a comparator, coupled to the pin, for comparing the composite signal with a threshold value to generate a comparative signal corresponding to the synchronization signal.

3. The image processing chip of claim 2, wherein the comparative signal corresponds to at least a first value and a second value, and the synchronization signal detecting circuit further comprises:
   a synchronization signal processing unit, for utilizing the comparative result to generate the synchronization signal when the comparative signal corresponds to the first value for a certain period.

4. The image processing chip of claim 2, wherein when the clamping circuit is operating, the DC restore circuit cease operation.

5. The image processing chip of claim 1, further comprising:
a voltage detecting unit, for receiving the synchronization signal and generating a control signal according to the synchronization signal.

6. The image processing chip of claim 5, wherein the voltage detecting unit receives a detecting signal and generating the control signal according to the synchronization signal and the detecting signal.

7. The image processing chip of claim 6, wherein the analog to digital converter receives the control signal and samples the composite signal according to the control signal to generate the image signal.

8. The image processing chip of claim 1, wherein the analog to digital converter generates the detecting signal and transmits the detecting signal to the voltage detecting unit.

9. The image processing chip of claim 5, wherein the analog to digital converter samples and quantifies the composite signal to generate the image signal according to the voltage level.

10. The image processing chip of claim 1, wherein the composite signal is a SOG (Sync On Green) signal or a SOY (Sync on Y) signal.

11. An video processing method applied in an image processing chip, the image processing chip having a pin for receiving a composite signal, the method comprising:
extracting, directly from the pin, a synchronization signal from the composite signal;
adjusting a voltage level of the composite signal according to the synchronization signal; and
generating an image signal by sampling the composite signal directly from the pin.

12. The method of claim 11, wherein the step of extracting the synchronization signal comprises:
adjusting the voltage level of the composite signal; and
comparing the composite signal with a threshold value to generate a comparative result corresponding to the synchronization signal.

13. The method of claim 12, wherein the comparative result corresponds to at least a first value and a second value, and the step of extracting the synchronization signal further comprises:
generating the synchronization signal according to the comparative result wherein the comparative signal corresponds to the first value for a period of time.

14. The method of claim 11, further comprising:
detecting a voltage level of the composite signal after receiving the synchronization signal;
wherein the step of generating the image signal comprising:
sampling and quantifying the composite signal to generate the video signal according to the voltage level.

15. The method of claim 11, further comprising:
receiving a detecting signal and generating a control signal according to the detecting signal and the synchronization signal.

16. The method of claim 15, further comprising:
receiving the control signal and sampling the composite signal according to the control signal to generate the image signal.

17. The method of claim 11, wherein the composite signal is a SOG (Sync On Green) signal or a SOY (Sync on Y) signal.

18. An image processing apparatus for processing a composite signal, comprising:
a synchronization signal detecting circuit configured to extract a synchronization signal from the composite signal;
a clamping circuit configured to adjust a voltage level of the composite signal according to the synchronization signal;
an analog to digital converter (ADC) configured to generate an image signal by sampling the composite signal; and
a voltage detecting circuit configured to generate a control signal for the analog to digital converter according to the synchronization signal,
wherein the synchronization signal detecting circuit, the clamping circuit, the ADC, and the voltage detecting circuit are connected directly to a pin receiving the composite signal.

19. The image processing apparatus of claim 18, wherein the clamping circuit is configured to adjust the voltage level of the composite signal according to a falling edge of the synchronization signal.

20. The image processing apparatus of claim 18, wherein the ADC is further configured to provide feedback signals to the voltage detecting circuit to adjust sampling by the ADC.

* * * * *